United States Patent
Sato et al.

(10) Patent No.: US 9,000,912 B2
(45) Date of Patent: Apr. 7, 2015

(54) MONITORING APPARATUS, MONITORING METHOD AND RECORDING MEDIUM OF MONITORING PROGRAM

(75) Inventors: Hirokazu Sato, Kawasaki (JP); Toshiyuki Ito, Kawasaki (JP); Yasuomi Iriyama, Kawasaki (JP); Yasumasa Oshiro, Kawasaki (JP); Tomohiro Nakamura, Yokohama (JP); Tomonori Ota, Kawasaki (JP); Junya Hiramatsu, Yokohama (JP); Yuta Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 13/524,216

(22) Filed: Jun. 15, 2012

(65) Prior Publication Data

US 2012/0326859 A1    Dec. 27, 2012

(30) Foreign Application Priority Data

Jun. 23, 2011    (JP) ................................ 2011-139907

(51) Int. Cl.
   *G08B 23/00*    (2006.01)
   *G06Q 10/08*    (2012.01)
   *G06F 11/30*    (2006.01)

(52) U.S. Cl.
   CPC .......... *G06Q 10/087* (2013.01); *G06F 11/3072* (2013.01)

(58) Field of Classification Search
   CPC ............... G08B 25/14; G05B 23/0259; G05B 23/0205; G05B 23/02; G05B 19/41875; G05B 2219/32191
   USPC ........ 340/529, 506, 527; 700/80, 21, 95, 108, 700/109, 110
   See application file for complete search history.

(56) References Cited

U.S. PATENT DOCUMENTS

| 5,735,546 A * | 4/1998 | Kurtzberg et al. .............. 283/67 |
| 6,642,846 B1 * | 11/2003 | Krubiner et al. ........... 340/545.3 |
| 2007/0012085 A1 * | 1/2007 | Higashide ..................... 73/1.01 |

FOREIGN PATENT DOCUMENTS

| JP | 64-28748 | 1/1989 |
| JP | 11-24742 | 1/1999 |
| JP | 2008-46925 | 2/2008 |

OTHER PUBLICATIONS

Japanese Office Action issued Dec. 2, 2014 in corresponding Japanese Patent Application No. 2011-139907.

* cited by examiner

*Primary Examiner* — Steven Lim
*Assistant Examiner* — Hongmin Fan
(74) *Attorney, Agent, or Firm* — Staas & Halsey LLP

(57) ABSTRACT

A monitoring apparatus includes a processor that executes a procedure, the procedure including outputting an alert when observation data satisfies a certain condition, the observation data being obtained at a certain time interval, suppressing the outputting of the alert in accordance with control, and performing control the suppressing until the certain time elapses since one of the outputting of the alert and the suppressing is performed.

3 Claims, 13 Drawing Sheets

FIG. 9

| ALERT NAME | CLASSIFICATION KEY | NUMBER OF MATCHES | LATEST OBSERVATION DATE AND TIME | |
|---|---|---|---|---|
| STOCK ALERT | TOKYO | 4 | 12:00 2/12/2011 | 901-1 |
| STOCK ALERT | OSAKA | 6 | 12:12 2/12/2011 | 901-2 |

FIG. 10

| ALERT NAME | CLASSIFICATION KEY | AVERAGE NUMBER OF MATCHES | NUMBER OF UPDATES | STANDARD DEVIATION | |
|---|---|---|---|---|---|
| STOCK ALERT | TOKYO | 4.3 | 15 | 1.3 | 1001-1 |
| STOCK ALERT | OSAKA | 7.1 | 12 | 2.1 | 1001-2 |

MONITORING APPARATUS, MONITORING METHOD AND RECORDING MEDIUM OF MONITORING PROGRAM

CROSS-REFERENCE TO RELATED APPLICATION

This application is based upon and claims the benefit of priority of the prior Japanese Patent Application No. 2011-139907, filed on Jun. 23, 2011, the entire contents of which are incorporated herein by reference.

FIELD

The embodiments discussed herein are related to a monitoring apparatus, a monitoring method, and a monitoring program.

BACKGROUND

There is a known technology which monitors business data (hereinafter referred to as "observation data") used in a company, and detects whether or not a problem has occurred based on the value of the observation data. For example, data indicating the stock of products in a warehouse is acquired at regular intervals, and when the stock reaches a dangerous zone (a threshold), an alert is sent to an administrator in charge of product management.

If a problem occurs that takes time to resolve, the same alert is sent to the administrator an excessive number of times. Furthermore, for example, a warehouse may have multiple products, and when alerts for multiple products are sent an excessive number of times, the administrator in charge of product management may become confused. To solve this, a technology has been disclosed which allows the administrator to designate a time period (hereinafter referred to as a "suppression time period") between an alert and the subsequent alert.

However, even when a suppression time period is designated by the administrator, the time taken to resolve the problem varies, and thus the suppression time period may expire before the problem is resolved, or after the problem is resolved a similar problem may occur before the suppression time period expires.

SUMMARY

According to an aspect of the invention, a monitoring apparatus includes a processor that executes a procedure, the procedure including outputting an alert when observation data satisfies a certain condition, the observation data being obtained at a certain time interval, suppressing the outputting of the alert in accordance with control, and performing control the suppressing until the certain time elapses since one of the outputting of the alert and the suppressing is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of an alert generation management table 900 according to the second embodiment;
FIG. 10 illustrates an example of an average number of matches management table 1000 according to the second embodiment.

DESCRIPTION OF EMBODIMENTS

In the present embodiment, output of an excessive number of alerts from the system is suppressed. For example, if the system is controlled or otherwise operated to only send an alert once, it is desirable to determine whether or not the alert has been issued once or two or more times in order to output the alert only when the observation data is checked and found to be abnormal for the first time. Therefore, a status flag or the like is desirably kept which indicates for each data check whether or not an alert is repeated.

However, regardless of whether a problem has occurred, if whether or not a normal alert is output is determined, or the status flag is updated or otherwise changed, the amount of processing performed by the monitoring apparatus is increased, which is an issue. Now, with the present embodiment, when the observation data available at regular intervals satisfies a condition for the first time, an alert is issued, but when the observation data available at subsequent regular intervals satisfies the condition, an alert is not issued, thus output of an excessive number of alerts may be prevented. In addition, when the observation data satisfies the condition, that is, a problem has occurred, processing is performed, however, when the observation data does not satisfy the condition, that is, no problem has occurred, no processing is performed.

Hereinafter, embodiments of a monitoring apparatus, a monitoring method, and a monitoring program according to an aspect of the present disclosure are described in detail with reference to the accompanying drawings.

Figure 1:
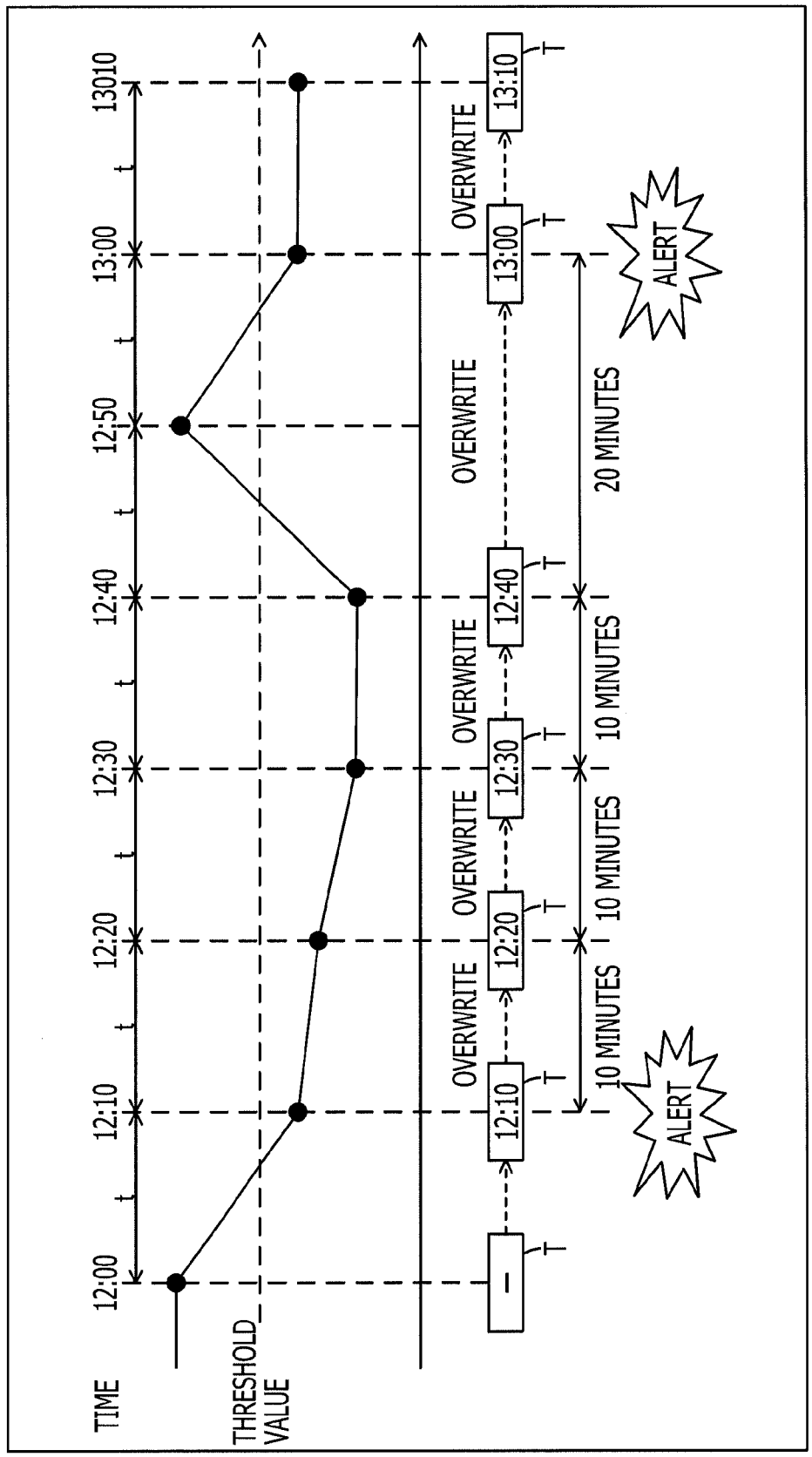
FIG. 1 illustrates a first example of a first embodiment.

FIG. 1 is an explanatory diagram illustrating a first embodiment. The monitoring apparatus acquires observation data every given time t. Here, the observation data may include stock data, production data, ordering data, financial data, or performance data, for example.

The monitoring apparatus then determines whether or not the observation data satisfies the condition. Here, the condition is that the observation data is less than a threshold in FIG. 1. For example, the threshold is 100. When the monitoring apparatus determines that the observation data satisfies the condition, an observation time of the observation data is stored in a storage device as a previous observation time T.

When the observation time is 12:00, the condition is determined to not be satisfied because the observation data is greater than or equal to the threshold. When the condition is determined to not be satisfied, the monitoring apparatus does not perform any particular process.

When the observation time is 12:10, the condition is determined to be satisfied because the observation data is less than the threshold. When the condition is determined to be satisfied, the monitoring apparatus determines whether or not the time interval between the previous observation time T stored in the storage device and the time when the observation data was obtained roughly equals to a given time t. Because no previous observation time T is stored in the storage device, the monitoring apparatus determines that there is no match. The monitoring apparatus, upon determining that there is no match, outputs an alert. The monitoring apparatus stores the observation time (12:10) as the previous observation time T.

When the observation time is 12:20, the condition is determined to be satisfied because the observation data is less than the threshold. When the monitoring device determines that the condition is satisfied, the monitoring apparatus determines whether or not the time interval x, which is the interval between the previous observation time T stored in the storage device and the time when the observation data was just obtained, roughly equals to the given time t. The determination may be made based on whether the time interval x satisfies $t \leq x < 2t$. Accordingly, no alert is output in a time period from t to two times as much as t. The value of x may be determined by a user input based on settings about an interval of observations. Without being limited to the above, the monitoring apparatus may determine 2t depending on the number of matches as in the second embodiment.

Here, because the time interval between the previous observation time T (12:10) and the observation time (12:20) is 10 minutes, the time interval is determined to match the given time t. The monitoring apparatus, upon determining that there is a match, outputs no alert, and stores the observation time (12:20) as the previous observation time T.

Similarly to when the observation time is 12:20, at the observation times of 12:30 and 12:40, no alert is output, and each observation time is stored in turn as the previous observation time T even if the condition is satisfied.

When the observation time is 12:50, the condition is determined to not be satisfied because the observation data is greater than or equal to the threshold. When it is determined that the condition is not satisfied, the monitoring apparatus does not perform any particular process. Thus, the previous observation time T remains as 12:40.

When the observation time is 13:00, it is determined that the condition is satisfied because the observation data is less than the threshold. When it is determined that the condition is satisfied, the monitoring apparatus determines whether or not the time interval between the previous observation time T stored in the storage device and the time when the observation data was just obtained matches the given time t. Because the time interval between the previous observation time T (12:40) and the current observation time (13:00) is 20 minutes, it is determined that the time interval does not match the given time t. The monitoring apparatus, upon determining that there is no match, outputs an alert, and stores the observation time (13:00) as the previous observation time T.

Although the observation time is used in FIG. 1, without being limited to this, an observation date, or an observation date and time may be used.

Conventionally, for example, when the observation data is less than a threshold at the observation time 12:10, the monitoring apparatus determines that a problem has occurred, and sends an alert to a person in charge. For example, at the observation time 12:20, the observation data is less than the threshold, however an alert is not sent because a suppression time period has not passed since the latest alert. For example, at the observation time 12:30, the observation data is less than the threshold, and an alert is sent because a suppression time period has passed since the latest alert.

In the first embodiment, when the observation data obtained at regular intervals satisfies the condition, an alert is sent, however, when the observation data at subsequent regular intervals continues to satisfy the condition, no alert is sent, thus output of an excessive number of alerts may be avoided. In addition, when the observation data satisfies the condition, that is, a problem has occurred, processing is performed, however, when the observation data does not satisfy the condition, that is, no problem has occurred, no processing is performed. The time period during which no problem occurs is much longer than the time period during which a problem occurs. Because no processing is performed in the time period during which no problem occurs, a monitoring load may be reduced.

Figure 2:
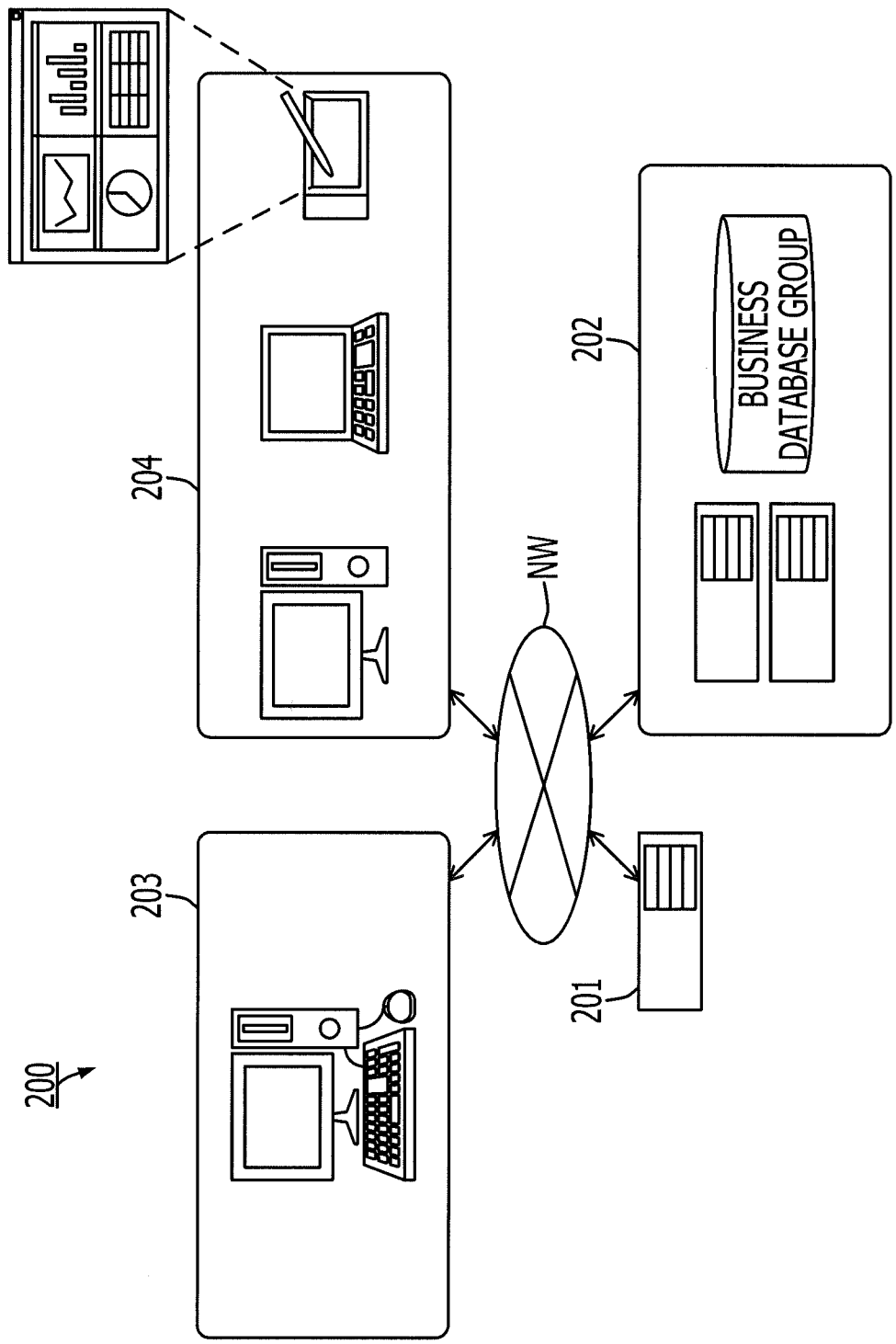
FIG. 2 illustrates an example of the present system according to the first embodiment.

FIG. 2 is an explanatory diagram illustrating an example of the present system. The system 200 has, for example, a monitoring server 201, a monitoring target business system 202, a definition client 203, and a web dashboard 204. The devices communicate with each other via a network NW. The hardware of the monitoring server 201 is described later with reference to FIG. 3.

For example, the web dashboard 204 compiles the observation data according to a user's operation, and receives an alert from the monitoring server 201. Specifically, for example, the web dashboard 204 is a mobile terminal, or a personal computer (PC) and in addition to the hardware of the monitoring server 201 illustrated in FIG. 3, the web dashboard 204 is assumed to have a display which allows a user to view an alert and a compilation result.

For example, the definition client 203 receives data input by an operation of a business administrator. For example, the definition client 203 is a PC, and in addition to the hardware of the monitoring server 201 illustrated in FIG. 3, the definition client 203 has a keyboard and/or a mouse, with which a business administrator may input a threshold.

For example, the monitoring target business system 202 registers observation data in a business database with the observation data being associated with an observation time. For example, there is a group of business databases, comprised of a business database for each type or classification key of the observation data. There may be a plurality (N) of monitoring target business systems 202. Each monitoring target business system 202 has the same hardware as illustrated for the monitoring server 201 in FIG. 3.

Figure 3:
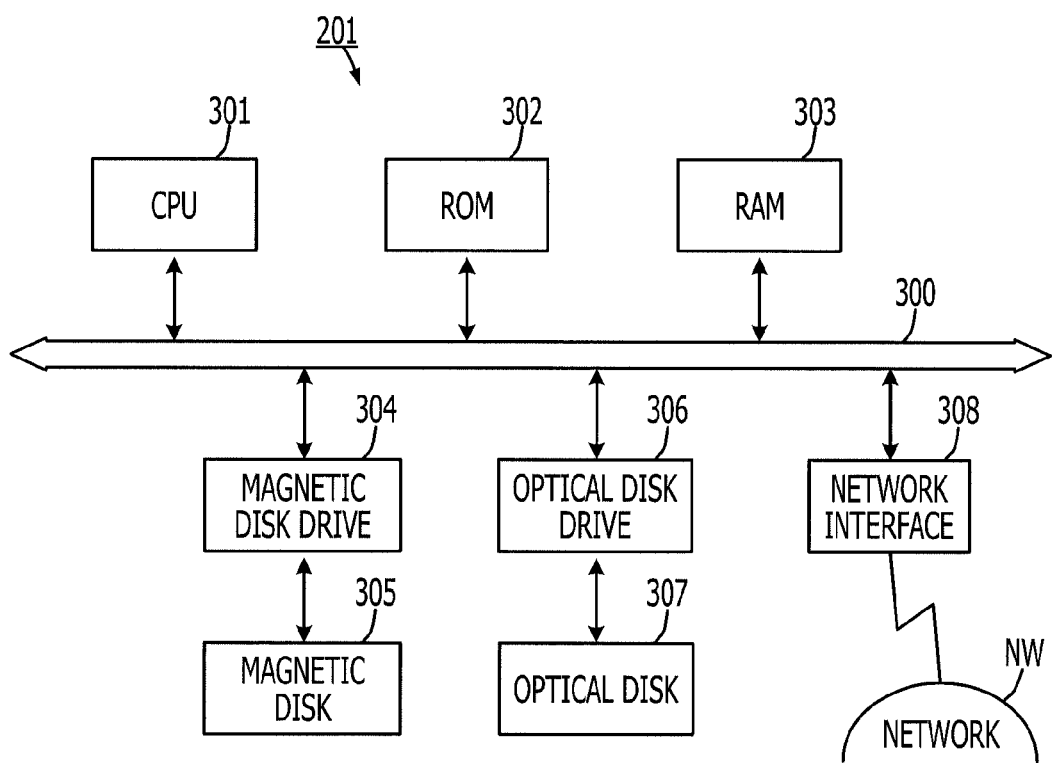
FIG. 3 illustrates a hardware example of a monitoring server.

FIG. 3 is a block diagram illustrating a hardware example of the monitoring server 201. In FIG. 3, the monitoring server 201 includes a central processing unit (CPU) 301, a read-only memory (ROM) 302, a random access memory (RAM) 303, a magnetic disk drive 304, a magnetic disk 305, an optical disk drive 306, an optical disk 307, and a network interface 308. The components are connected to each other via a bus 300. The CPU 301 is an example of a processor, and, for example, may be a graphics processing unit (GPU), a floating-point unit (FPU), or a digital signal processor (DSP).

Here, the CPU 301 manages overall control of the monitoring apparatus. The ROM 302 stores a program such as a boot program. The RAM 303 is used as a work area for the CPU 301. The magnetic disk drive 304 controls reading and writing of data from and to the magnetic disk 305 in accordance with control performed by the CPU 301. The magnetic disk 305 stores data written as a result of control being performed by the magnetic disk drive 304.

The optical disk drive 306 controls reading and writing of data from and to the optical disk 307 in accordance with control performed by the CPU 301. The optical disk 307 stores data written as a result of control being performed by the optical disk drive 306, and causes a computer to read the data stored by the optical disk 307.

The network interface 308 is connected to a network NW via a communication line, and is connected to other devices via the network NW. The network NW is a network, such as a local area network (LAN), a wide area network (WAN), or the Internet. The network interface 308 manages the network NW and an internal interface and controls input and output of data to and from an external device. As the network interface 308, for example, a modem, or a LAN adapter may be used.

Figure 4:
FIG. 4 illustrates an example of an alert generation management table.

FIG. 4 is an explanatory diagram illustrating an example of an alert generation management table 400. The alert generation management table 400 has fields such as alert name, classification key, and last observation date and time. A type of an alert, such as a stock alert, is registered in the alert name field. A place name, such as "Tokyo" or "Osaka", is registered in the classification key field. The date and time for observation data are sequentially overwritten and registered in the last observation date and time field if the observation data satisfies a condition.

The records (401-1, 401-2) are registered by setting a value in each field. The alert generation management table 400 is stored in a storage device, such as the RAM 303, the magnetic disk 305, or the optical disk 307.

Figure 5:
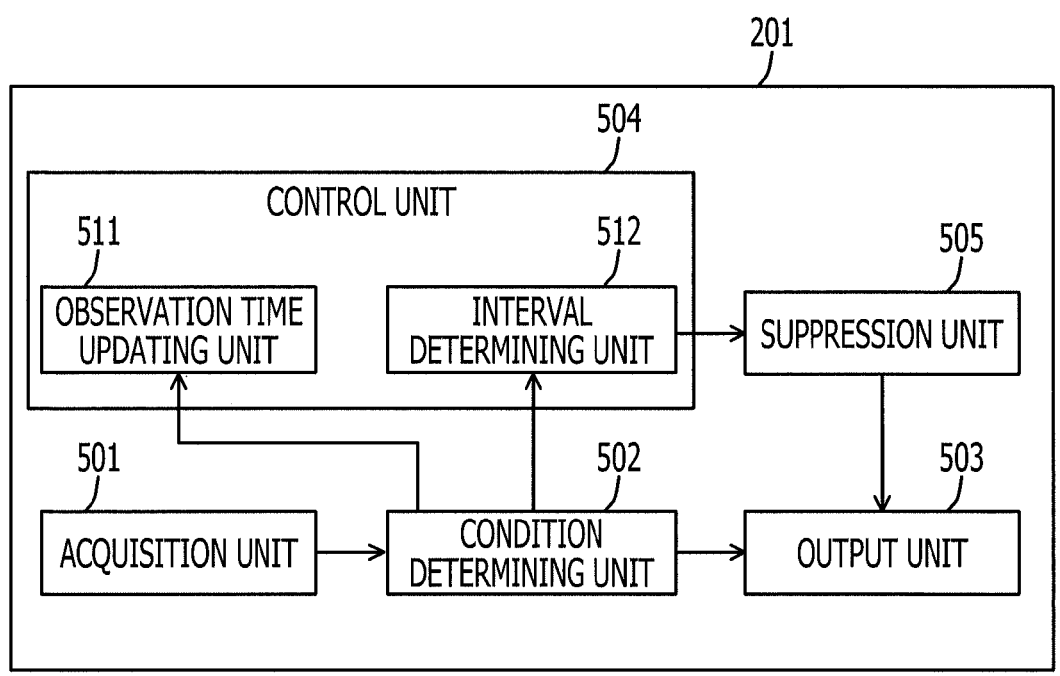
FIG. 5 illustrates an example of the functional block diagram of the monitoring server according to the first embodiment.

FIG. 5 is an explanatory diagram illustrating an example of the functional block diagram of the monitoring server 201 according to the first embodiment. The monitoring server 201 has an acquisition unit 501, a condition determining unit 502, an output unit 503, a control unit 504, and a suppression unit 505. The control unit 504 has, for example, an observation time updating unit 511 and an interval determining unit 512.

Specifically, units from the acquisition unit 501 to the suppression unit 505 are coded in a monitoring program stored in a storage device, such as the ROM 302, the RAM 303, the magnetic disk 305 or the optical disk 307 illustrated in FIG. 3. The CPU 301 reads the monitoring program from the storage device, and executes the process coded in the monitoring program, thereby implementing the functions of the acquisition unit 501, the condition determining unit 502, the output unit 503, the control unit 504 and the suppression unit 505.

The acquisition unit 501 acquires observation data every given time t. Specifically, for example, the acquisition unit 501 acquires the latest observation data from a target business database among the group of business databases for the corresponding monitoring target business system 202 via the network NW. Here, processing of observation data, for example, with a classification key of "Tokyo" and an alert type of "stock alert" is described by way of example.

The condition determining unit 502 determines whether or not observation data, which is acquired by the acquisition unit 501 every given time t, satisfies the condition. Specifically, for example, the condition determining unit 502 determines whether or not the observation data is greater than or equal to a threshold. Specifically, for example, the condition determining unit 502, upon determining that the observation data is less than the threshold, determines that the observation data satisfies the condition, and upon determining that the observation data is greater than or equal to the threshold, determines that the observation data does not satisfy the condition. Without being limited to the above, for example, the condition determining unit 502 may determine that the observation data satisfies the condition when the observation data is less than or equal to the threshold, and may determine that the observation data does not satisfy the condition when the observation data is greater than the threshold.

When the condition determining unit 502 determines that the observation data satisfies the condition, the output unit 503 outputs an alert. Specifically, for example, the output unit 503 transmits a mail regarding the alert to the web dashboard 204 through the network interface 308 via the network NW. Without being limited to the above, for example, the output unit 503 displays the alert on the display of the web dashboard 204 through the network interface 308 via the network NW.

The control unit 504 controls the suppression unit 505 to suppress output of alert until a given time has elapsed since either an alert is output by the output unit 503. Before an update is made by the observation time updating unit 511, the interval determining unit 512 determines whether or not the time interval between the observation date and time when new observation data satisfying the condition is acquired and the observation date and time stored in the storage device matches the given time t. Specifically, for example, the interval determining unit 512 acquires the current date and time. For example, the interval determining unit 512 identifies a record with a classification key of "Tokyo" and an alert type of "stock alert" from the alert generation management table 400. For example, the interval determining unit 512 determines whether or not the time interval between the value of the last observation date and time field for the identified record, and the current date and time matches the given time t. For example, if there is no identified record, the interval determining unit 512 determines that the time interval does not match the given time t.

The observation time updating unit 511 overwrites the observation time of observation data in the storage device, the observation data having been determined to satisfy the condition by the condition determining unit 502. Specifically, for example, when the observation data is determined to satisfy the condition by the condition determining unit 502, the observation time updating unit 511 overwrites and saves the current date and time in the last observation date and time field of the record identified by the interval determining unit 512. For example, if no record is identified by the interval determining unit 512, the observation time updating unit 511 registers "stock alert" in the alert name field in the alert generation management table 400. The observation time updating unit 511 then registers "Tokyo" in the classification key field, and the current date and time in the last observation date and time field. Accordingly, a new record is generated in the alert generation management table 400.

The suppression unit 505 suppresses alerts, which are output by the output unit 503 in accordance with the control performed by the control unit 504. Specifically, for example, if a match is found by the interval determining unit 512, the suppression unit 505 controls the output unit 503 to stop the output of an alert. Specifically, for example, when no match is found by the interval determining unit 512, the suppression unit 505 causes the output unit 503 to output an alert.

Figure 6:
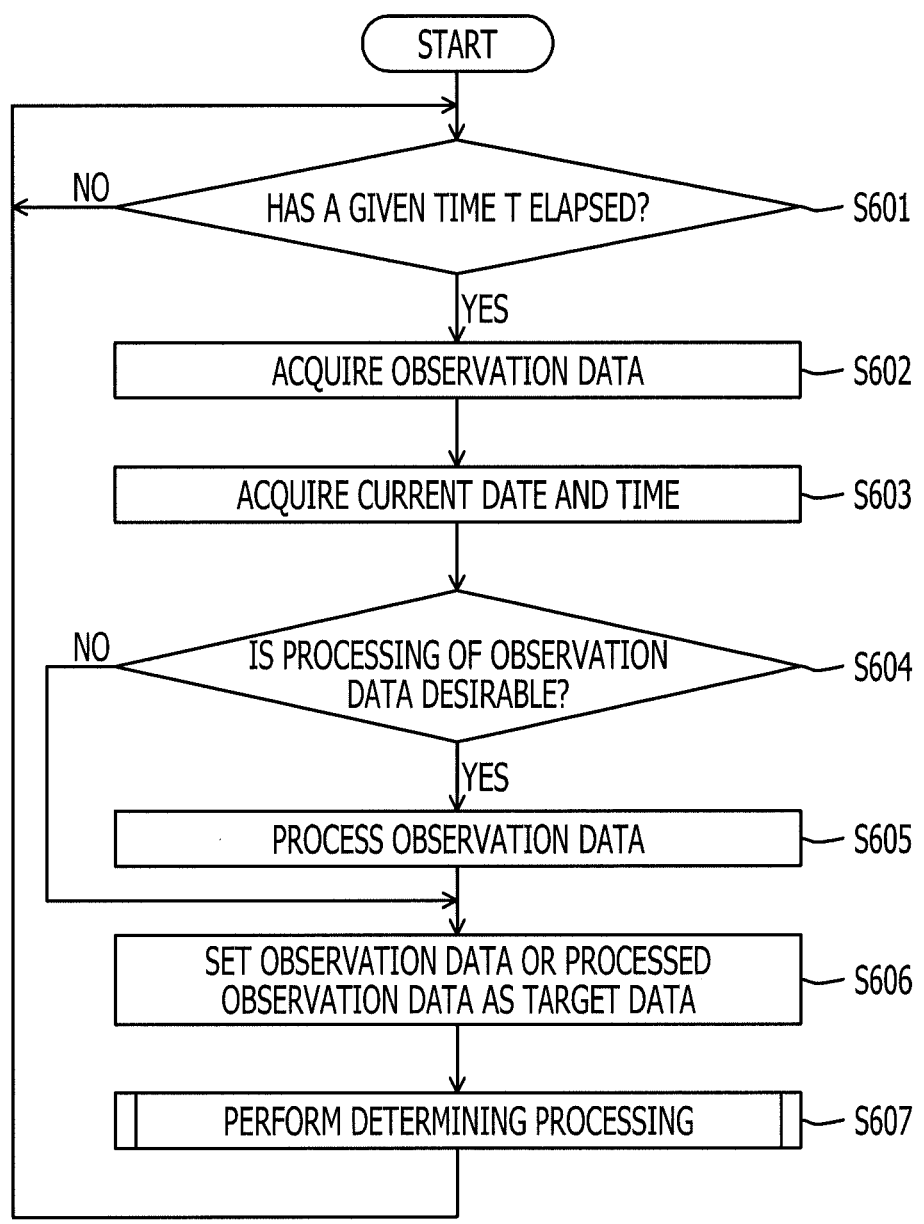
FIG. 6 illustrates the monitoring procedure performed by the monitoring server.

FIG. 6 is a flowchart illustrating the monitoring procedure performed by the monitoring server 201. The monitoring server 201 determines whether or not the given time t has elapsed by using the acquisition unit 501 (S601). If the monitoring server 201 determines that the given time t has not elapsed ("No" in S601), the process returns to S601.

If the monitoring server 201 determines that the given time t has elapsed ("Yes" in S601), observation data is acquired by the acquisition unit 501 (S602). The monitoring server 201 acquires the current date and time (S603). The monitoring server 201 determines whether or not it is desirable to process the observation data (S604).

If the monitoring server 201 determines that it is desirable to process the observation data ("Yes" in S604), the observation data is processed (S605), and the process proceeds to S606. The processing of the observation data is, for example, multiplying the observation data by a coefficient.

If the monitoring server 201 determines in S604 that it is not desirable to process the observation data S ("No" in S604), the process proceeds to S606. The observation data or processed observation data is set as target data (S606). The monitoring server 201 then performs determination processing (S607), and the process returns to S601.

Figure 7:
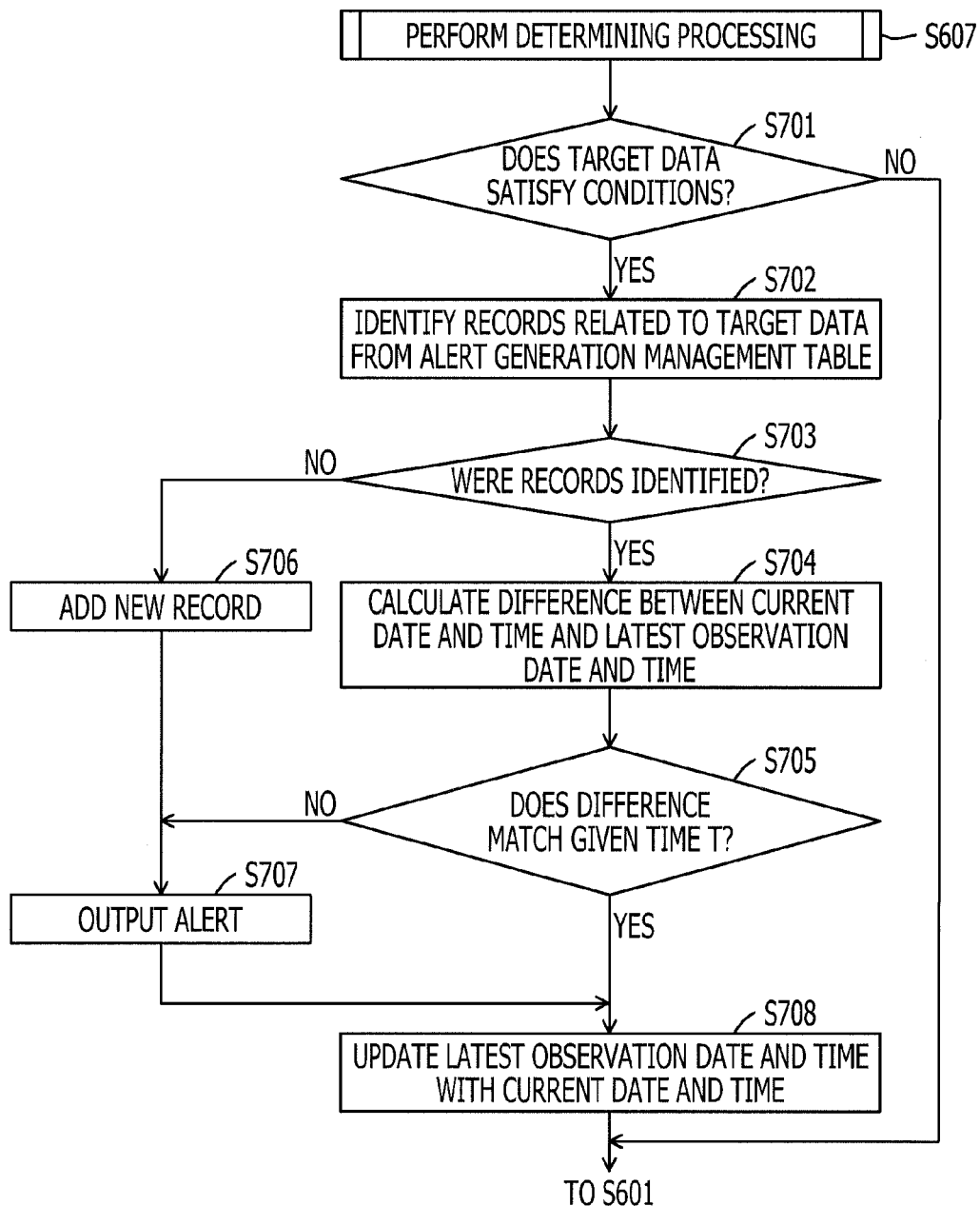
FIG. 7 illustrates a detailed description of the determination process (S607) illustrated in FIG. 6.

FIG. 7 is a flowchart illustrating a detailed explanation of the determination process (S607) illustrated in FIG. 6. First, the monitoring server 201 determines whether or not the target data satisfies the condition (S701), and if it is determined that the target data does not satisfy the condition ("No" in S701), the process returns to S601. That is, when it is determined that the target data does not satisfy the condition, no processing is performed.

If the monitoring server 201 determines that the target data satisfies the condition ("Yes" in S701), the monitoring server 201 identifies a record relevant to the target data from the alert generation management table 400 (S702). The monitoring server 201 determines whether or not a relevant record is identified (S703), and if a relevant record is identified ("Yes" in S703), the difference between the current date and time and the last observation date and time is calculated (S704).

The monitoring server 201 determines whether or not the difference matches the given time t (S705). If the monitoring server 201 determines that the difference matches the given time t ("Yes" in S705), the process is made to proceed to S708 by the suppression unit 505. That is, if the difference matches the given time t, the output unit 503 outputs no alert. A case where the difference matches the given time t indicates that the observation data does not satisfy the condition successively. Thus, even if the observation data continues to satisfy the condition, an alert is output only at the first determination.

If the monitoring server 201 determines that the difference does not match the given time t ("No" in S705), the process is made to proceed to S707 by the output unit 503. If the monitoring server 201 fails to identify any record in S703 ("No" in S703), a new record is added to the alert generation management table 400 (S706). After S706 or "No" in S705, the monitoring server 201 causes the output unit 503 to output an alert (S707), and the process proceeds to S708.

After "Yes" in S705 or S707, the monitoring server 201 causes the observation time updating unit 511 to update the last observation date and time of the identified record or the new record with the current date and time (S708), and the process returns to S601.

Figure 8:
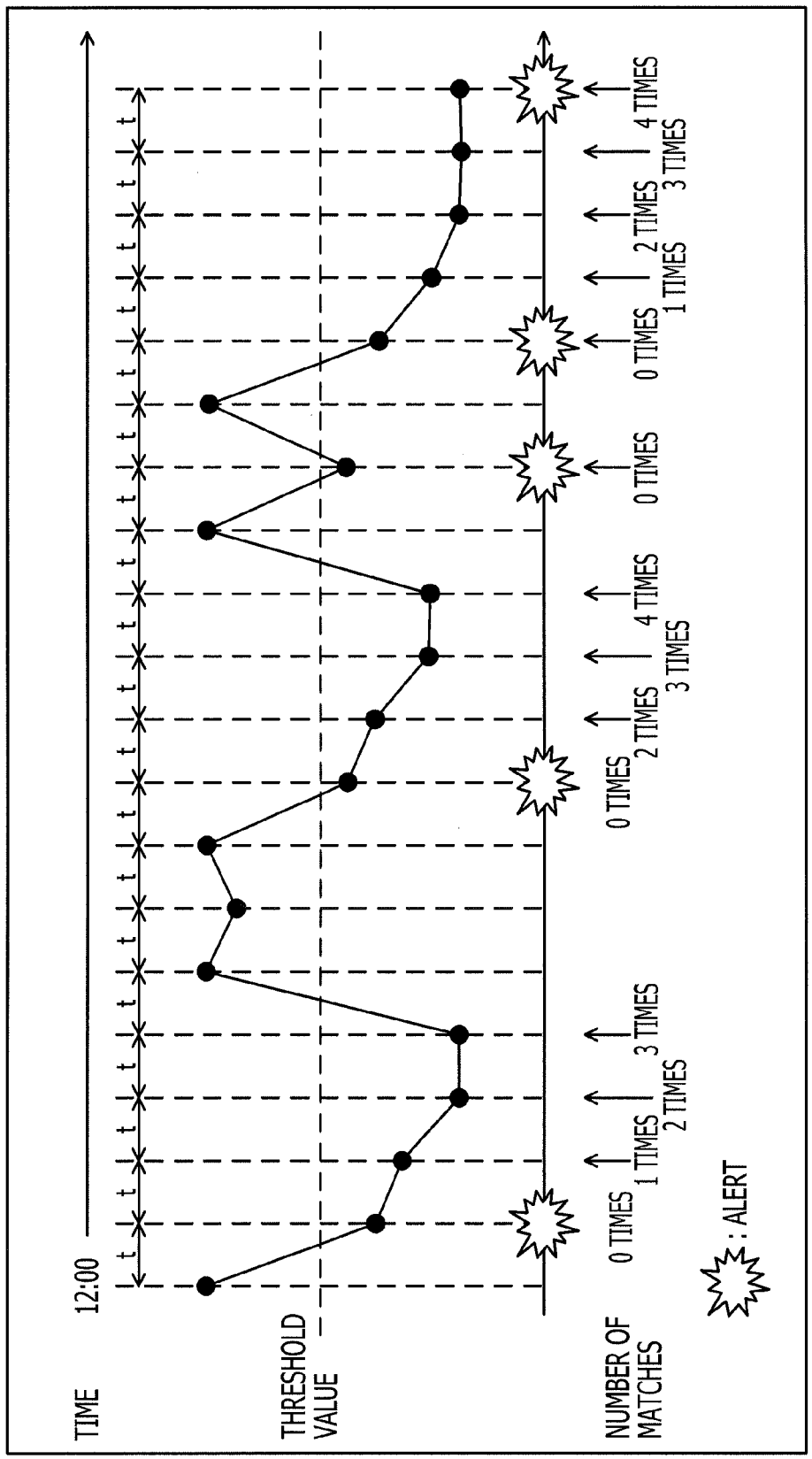
FIG. 8 illustrates a second embodiment.

FIG. 8 is an explanatory diagram illustrating the second embodiment. In the second embodiment, if the observation data satisfies the condition, and the difference between the last observation date and time and the current date and time stored in the storage device has been matched so far for a given number of times or more, an alert is output again. In FIG. 8, for example, when the number of matches reaches 4, an alert is output because the given number-of-times is 4. For example, the given number of times is determined based on the time taken by past observation data until the past observation data stopped satisfying the condition. Accordingly, when a state in which the observation data satisfies the condition continues for a long time, an alert may be output again.

In the second embodiment, portions or data that is the same as portions or data described in the first embodiment are labeled with the same reference symbols, and description thereof is omitted.

FIG. 9 is an explanatory diagram illustrating an example of the alert generation management table 900 according to the second embodiment. An alert generation management table 900 has fields for alert name, classification key, number of matches, and the last observation date and time. For example, an alert type, such as a stock alert, is registered in the alert name field. A name of a place, such as "Tokyo" or "Osaka", is registered in the classification key field. For example, the number of matches since the observation data came to satisfy the condition is registered in the number of matches field. The date and time of observation data are sequentially overwritten and registered in the last observation date and time field as long as the observation data satisfies the condition.

The records (901-1, 901-2) are registered by setting a value in each field. The alert generation management table 900 is assumed to be stored in a storage device such as the RAM 303, the magnetic disk 305, or the optical disk 307.

FIG. 10 is an explanatory diagram illustrating an example of an average number of matches management table 1000 according to the second embodiment. An average number of matches management table 1000 has fields for alert name, classification key, average number of matches, number of updates, and standard deviation. A type of alert such as "stock alert" is registered in the alert name field. A place name, such as "Tokyo" or "Osaka", is registered in the classification key field.

The average number of matches field is registered with the average number of times that the given time t matches the time interval between the observation date and time for new observation data that matches the condition, and the last observation date and time, which is recorded in the alert generation management table 900. The initial value of the average number of matches is, for example, input by an operation of a business administrator of the definition client 203. The number of updates of the average number of matches is registered in the number of updates field. The standard deviation of the average number of matches is registered in the standard deviation field.

The records (for example, 1001-1, 1001-2) are registered by setting a value in each field. The average number of matches management table 1000 is stored in a storage device, such as the RAM 303, the magnetic disk 305, or the optical disk 307.

Figure 11:
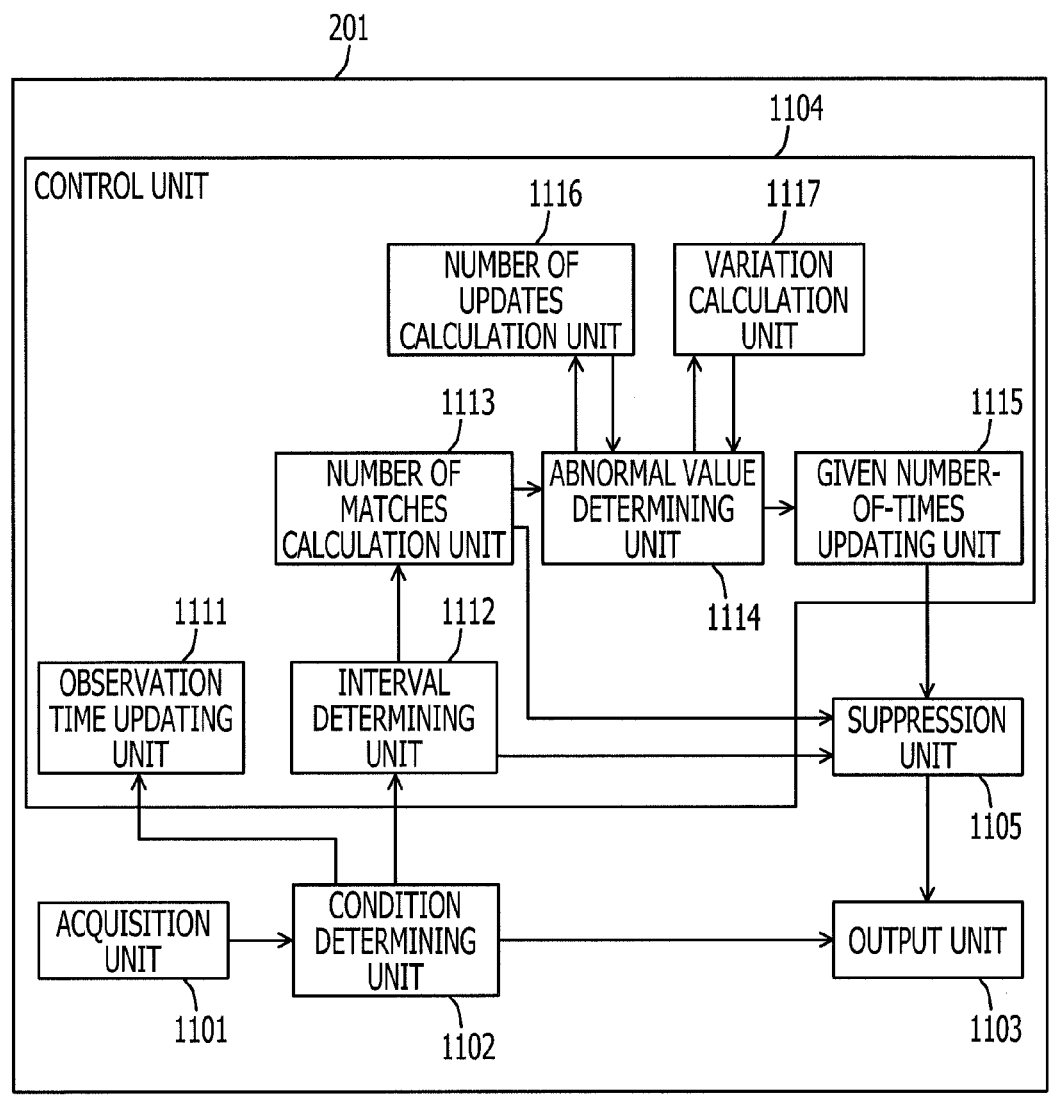
FIG. 11 illustrates an example of the functional block diagram of a monitoring server according to the second embodiment.

FIG. 11 is an explanatory diagram illustrating an example of the functional block diagram of the monitoring server 201 according to the second embodiment. The monitoring server 201 has an acquisition unit 1101, a condition determining unit 1102, an output unit 1103, a control unit 1104, and a suppression unit 1105. Specifically, units from the acquisition unit 1101 to the suppression unit 1105 may be coded in a monitoring program stored in a storage device such as the ROM 302, the RAM 303, the magnetic disk 305 or the optical disk 307 illustrated in FIG. 3. The CPU 301 reads the monitoring program from the storage device, and executes the process coded in the monitoring program, thereby implementing the functions of units from the acquisition unit 1101 to the suppression unit 1105.

The acquisition unit 1101, the condition determining unit 1102, the output unit 1103, and the suppression unit 1105 have the same details as the details of the acquisition unit 501, the condition determining unit 502, the output unit 503, and the suppression unit 505 that are illustrated in the first embodiment, respectively, thus detailed description thereof is omitted.

The control unit 1104 has an observation time updating unit 1111, an interval determining unit 1112, a number of matches calculation unit 1113, an abnormal value determining unit 1114, a given number-of-times updating unit 1115, a number of updates calculation unit 1116, and a variation calculation unit 1117. The observation time updating unit 1111, and the interval determining unit 1112 have the same details as those of the observation time updating unit 511, and the interval determining unit 512 that are illustrated in the first embodiment, respectively, and thus detailed description thereof is omitted.

When alert output is continually suppressed by the suppression unit 1105 for a given number of times, the control unit 1104 performs suppression control, which is control so as to not suppress alert output, when the number of suppressions is equal to the given number of times. In addition, the control unit performs non-suppression control based on the average number of times suppression control is performed. Specifically, the control unit 1104 performs processing according to the number of matches calculation unit 1113, the abnormal value determining unit 1114, the given number-of-times updating unit 1115, the number of updates calculation unit 1116, and the variation calculation unit 1117. In the second embodiment, the number of times suppression control is performed is the number of matches c minus 1.

When a match is determined to have occurred by the interval determining unit 1112, the number of matches calculation unit 1113 calculates the number of matches c, which is the number of times continuous matching is determined to have occurred. Specifically, for example, the number of matches calculation unit 1113 increments the value of the number of matches field in the record related to observation data in the alert generation management table 900.

In addition, when non-matching is determined by the interval determining unit 1112, the number of matches calculation unit 1113 resets the number of matches. Specifically, for example, the number of matches calculation unit 1113 sets the value of the number of matches field to 0 for the record in the alert generation management table 900 related to the observation data.

When a match is determined by the interval determining unit 1112, and the number of matches calculated by the number of matches calculation unit 1113 is greater than or equal to the given number-of-times, the suppression unit 1105 causes the output unit 1103 to output an alert. Here, the given number-of-times is the value registered in the average number of matches field in the average number of matches management table 1000 (hereinafter referred to as "average number of matches a").

When non-matching is determined by the interval determining unit 1112, the abnormal value determining unit 1114 determines whether or not the number of matches is an abnormal value based on the average number of matches and variation information of the average number of matches. Here, the variation information is the value registered in the standard deviation field in the average number of matches management table 1000 (hereinafter referred to as "standard deviation σ").

Specifically, for example, when either one of expression (1) or expression (2) is satisfied, the abnormal value determining unit 1114 determines that the number of matches c is an abnormal value.

number of matches $c$>average number of matches $a$+2×standard deviation σ   (1)

number of matches $c$<average number of matches $a$−2×standard deviation σ   (2)

In detail, when either the above expression (1) or expression (2) is satisfied, the number of matches c is determined to be out of the range of values that contains about 95% of the past number of matches c.

If the number of matches c is determined to be a normal value by the abnormal value determining unit 1114, the given number-of-times updating unit 1115 updates the average number of matches a based on the number of matches c, the average number of matches a, and the number of updates of the average number of matches a before the number of matches c is reset by the number of matches calculation unit 1113. Here, the number of updates of the average number of matches a is the value registered in the number of updates field in the average number of matches management table 1000 (hereinafter referred to as "number of updates u").

Specifically, for example, the given number-of-times updating unit 1115 calculates and updates the average number of matches a based on the following expression (3).

average number of matches $a$=(average number of matches $a$×number of updates $u$+number of matches $c$)÷(number of updates $u$+1)   (3)

When the number of matches c is determined to be an abnormal value by the abnormal value determining unit 1114, the given number-of-times updating unit 1115 does not update the average number of matches a.

After the number of matches c is updated by the given number-of-times updating unit 1115, the number of updates calculation unit 1116 calculates the number of updates u. Specifically, for example, the number of updates calculation unit 1116 increments the number of updates u. If the number of matches c is determined to be an abnormal value by the abnormal value determining unit 1114, the number of updates calculation unit 1116 does not calculate the number of updates u.

When the number of matches c is determined to be a normal value by the abnormal value determining unit 1114, the variation calculation unit 1117 calculates the standard deviation σ based on the number of matches c and the number of updates u calculated by the number of updates calculation unit 1116. Specifically, example, the variation calculation unit 1117 calculates the standard deviation σ by determining the variance $\sigma^2_u$ with the following expression (4).

variance $\sigma^2_u$=(1/number of updates $u$)×((number of updates $u$−1)×variance $\sigma^2_{(u-1)}$+(number of matches $c$−average number of matches $a$)$^2$)   (4)

Although the variance $\sigma^2_{(u-1)}$ is used in Expression (4), without being limited to the above, the variance $\sigma^2_u$ may be calculated, for example, by storing all of the past number of matches.

When the number of matches c is determined to be an abnormal value by the abnormal value determining unit 1114, the variation calculation unit 1117 does not recalculate the standard deviation a.

Figure 12:
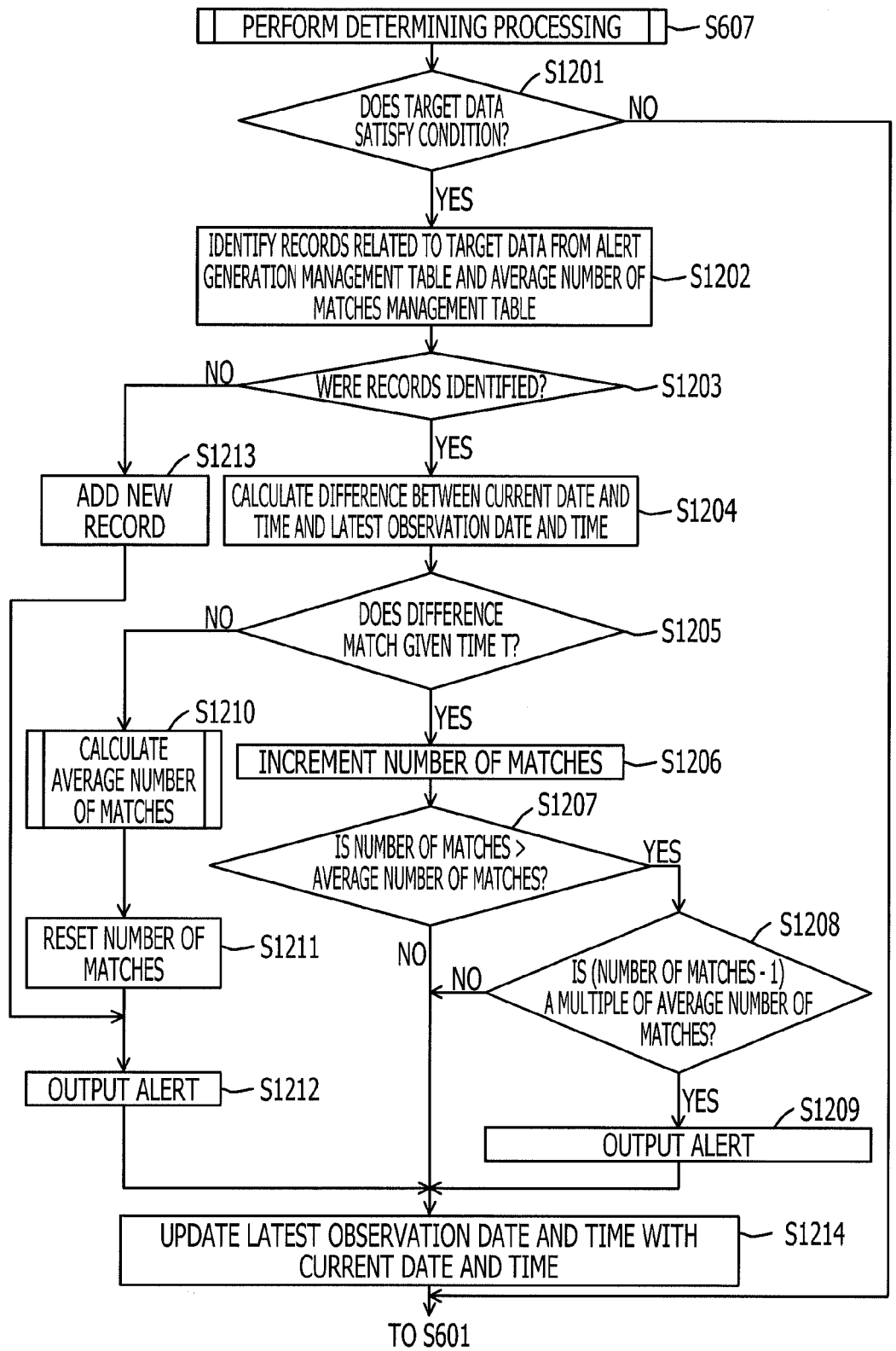
FIG. 12 illustrates the determination process (S607) illustrated in FIG. 6 according to the second embodiment.

FIG. 12 is a flowchart illustrating a detailed explanation of the determination process (S607) illustrated in FIG. 6 according to the second embodiment. Specifically, the monitor procedure performed by the monitoring server 201 according to the second embodiment is the same as in the first embodiment except for the determination process (S607). Thus, only the determination process (S607) according to the second embodiment is described here.

The monitoring server 201 determines whether or not the target data satisfies the condition according to the condition determining unit 1102 (S1201), and if it is determined that the target data does not satisfy the condition ("No" in S1201), the process returns to S601. When the monitoring server 201 determines that the target data satisfies the condition ("Yes" in S1201), the record related to the target data is identified based on the alert generation management table 900 and the average number of matches management table 1000 (S1202).

If the monitoring server 201 determines whether or not identification is made (S1203) and if it is determined that identification is made ("Yes" in S1203), the interval determining unit 1112 calculates the difference between the current date and time and the last observation date and time (S1204).

The monitoring server 201 determines whether or not the difference roughly equals to the given time t according to the interval determining unit 1112 (S1205), and when a match is determined ("Yes" in S1205), the number of matches calculation unit 1113 increments the number of matches (S1206).

The monitoring server 201 determines whether or not the number of matches is greater than the average number of matches (S1207). If the monitoring server 201 determines that the number of matches is greater than the average number of matches ("Yes" in S1207), it is determined whether or not (number of matches−1) is a multiple of the average number of matches (S1208). For example, for the calculation of a multiple of the average number of matches, the multiple may be rounded to an integer, or the first decimal place of the multiple may be truncated.

If the monitoring server 201 determines that (number of matches−1) is a multiple of the average number of matches ("Yes" in S1208), the output unit 1103 outputs an alert (S1209) and the process proceeds to S1214. Therefore, if continuous matching is determined, an alert may be output every average number of matches.

If the monitoring server 201 determines that the number of matches is not greater than the average number of matches in S1207 ("No" in S1207), the process proceeds to S1214. If the monitoring server 201 determines that (the number of matches−1) is not a multiple of the average number of matches in S1208 ("No" in S1208), the process proceeds to S1214.

If the monitoring server 201 determines that the difference does not match the given time t in S1205 ("No" in S1205), the average number of matches is calculated (S1210). The monitoring server 201 resets the number of matches through the number of matches calculation unit 1113 (S1211), causes the output unit 1103 to output an alert (S1212), and the process proceeds to S1214.

If the monitoring server 201 determines that identification is not made in S1203 ("No" in S1203), a new record is added by setting respective values to the alert generation management table 900 and the average number of matches management table 1000 (S1213), and the process proceeds to S1212.

After "No" in S1207, "No" in S1208, S1209, and S1212, the monitoring server 201 updates the last observation date and time to the current date and time via the observation time updating unit 1111 (S1214), and the process proceeds to S601.

Figure 13:
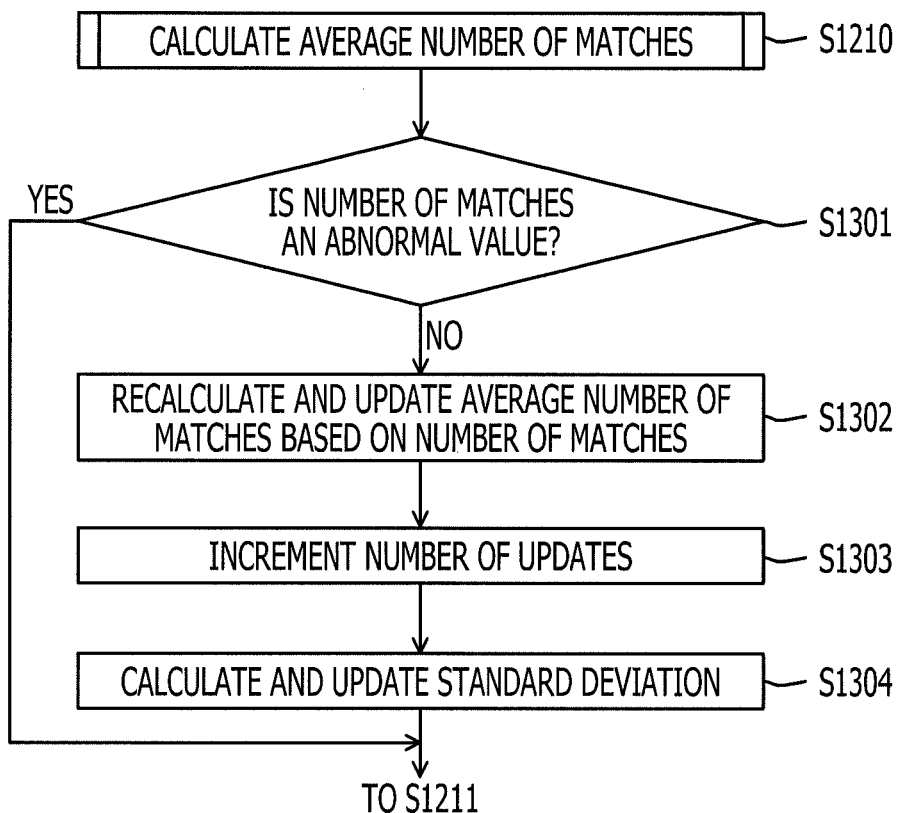
FIG. 13 illustrates the calculation process (S1210) of an average number of matches as illustrated in FIG. 12.

FIG. 13 is a flowchart illustrating a detailed explanation of the calculation process (S1210) of the average number of matches illustrated in FIG. 12. The monitoring server 201 determines whether or not the number of matches is an abnormal value via the abnormal value determining unit 1114 (S1301). Whether or not the number of matches is an abnormal value is determined by whether expression (1) or expression (2) as described above is satisfied.

If the monitoring server 201 determines that the number of matches is an abnormal value ("Yes" in S1301), the process proceeds to S1211. If the monitoring server 201 determines that the number of matches is a normal value ("No" in S1301), the average number of matches is newly calculated and updated by the given number-of-times updating unit 1115 based on the number of matches (S1302). The average number of matches is calculated based on expression (3) described above.

The monitoring server 201 increments the number of updates via the number of updates calculation unit 1116 (S1303), the standard deviation is calculated and updated via the variation calculation unit 1117 (S1304), and the process proceeds to S1211. The standard deviation is calculated based on the variance obtained by expression (4).

As described above, if the observation data obtained every given time continues to satisfies the condition, the previous observation time when the condition was satisfied is stored, and only if the difference between the stored observation time and the observation time of the observation data matches the given time is an alert is output, thus output of an excessive number of alerts may be reduced if not prevented.

If the observation data satisfies the condition, that is, a problem has occurred, processing is performed. However, if the observation data does not satisfy the condition, that is, no problem has occurred, little or no processing is performed. The time period during which no problem occurs is much longer than the time period during which a problem occurs. Because no process is performed in the time period during which no problem occurs, a monitoring load may be reduced.

If a state in which the observation data satisfies the condition continues for a long period of time, that is, a state in which a problem occurs continues for a long period of time, an alert is output again based on a certain amount of time taken to solve the problem in the past. The certain amount of time is determined based on the number of times for the event that the difference between the stored observation time and the observation time of the observation data matches the given time.

In addition, the average number of matches may be optimized by calculating the average number of matches after removing any number of matches that deviate significantly from the average using the variation information, thus an alert may be output at an optimal timing.

The monitoring methods described in the second embodiment may be achieved by causing a computer such as a personal computer or a workstation to execute a previously prepared monitoring program. The monitoring program may be stored in a computer-readable recording medium such as a hard disk, a floppy disk, a CD-ROM, a magneto-optical disc, or a DVD, and is executed by a computer reading the monitoring program from the recording medium. The monitoring program may be distributed via the network NW such as the Internet. According to one aspect of the above-described second embodiment, output of an excessive number of alerts may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus comprising:
   a processor that executes a procedure, the procedure including:
   starting from an initial time, acquiring observation data at the initial time and at every given time period t;
   determining, at the initial time and at every given time period t, whether the acquired observation data satisfies a certain condition;
   at the initial time and at every given time period t, when the observation data satisfies the certain condition, storing a current observation time of the observation data as a current observation time T and determining whether a time interval between the current observation time T and a stored previous observation time T equals the given time period t;
   when either the time interval does not equal the given time period t or no previous observation time T is stored, outputting an alert and storing the current observation time T as the previous observation time; and
   when the time interval does equal the given time period t, suppressing the outputting of the alert and storing the current observation time T as the previous observation time.

2. A monitoring method comprising:
   starting from an initial time, acquiring observation data at the initial time and at every given time period t;
   determining, at the initial time and at every given time period t, whether the acquired observation data satisfies a certain condition;
   at the initial time and at every given time period t, when the observation data satisfies the certain condition, storing a current observation time of the observation data as a current observation time T and determining whether a time interval between the current observation time T and a stored previous observation time T equals the given time period t;
   when either the time interval does not equal the given time period t or no previous observation time T is stored, outputting an alert and storing the current observation time T as the previous observation time; and
   when the time interval does equal the given time period t, suppressing the outputting of the alert
   and storing the current observation time T as the previous observation time.

3. A computer-readable, non-transitory recording medium storing a monitoring program that causes a computer to execute a procedure, the procedure including:
   starting from an initial time, acquiring observation data at the initial time and at every given time period t;
   determining, at the initial time and at every given time period t, whether the acquired observation data satisfies a certain condition;
   at the initial time and at every given time period t, when the observation data satisfies the certain condition, storing a current observation time of the observation data as a current observation time T and determining whether a time interval between the current observation time T and a stored previous observation time T equals the given time period t;
   when either the time interval does not equal the given time period t or no previous observation time T is stored, outputting an alert and storing the current observation time T as the previous observation time; and
   when the time interval does equal the given time period t, suppressing the outputting of the alert
   and storing the current observation time T as the previous observation time.

* * * * *